April 30, 1935.  W. A. ROSS  1,999,947
BRAKE TESTING MECHANISM
Filed Feb. 9, 1932  3 Sheets-Sheet 1
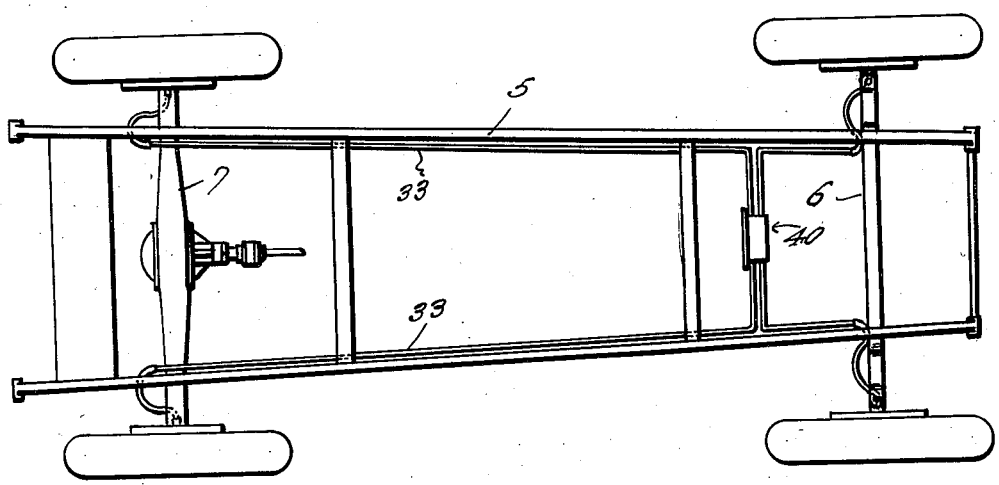
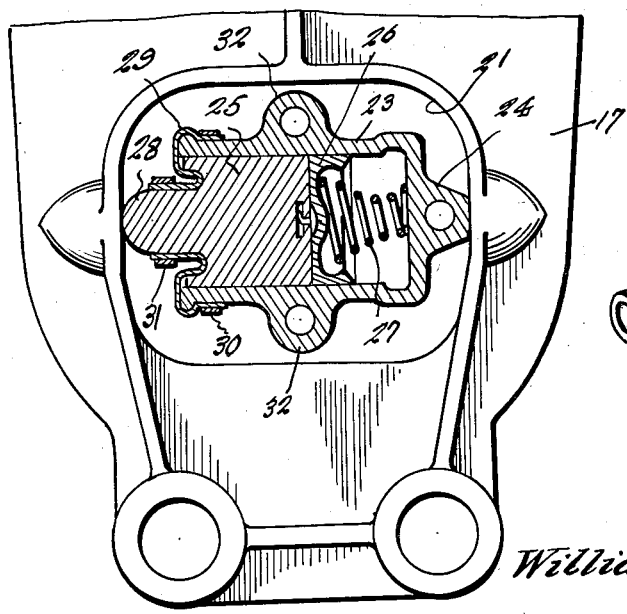
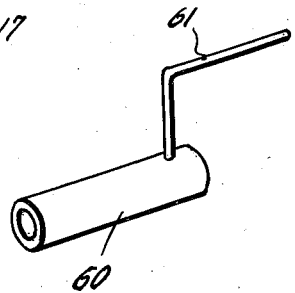
Inventor
William A. Ross
By Clarence A. O'Brien
Attorney

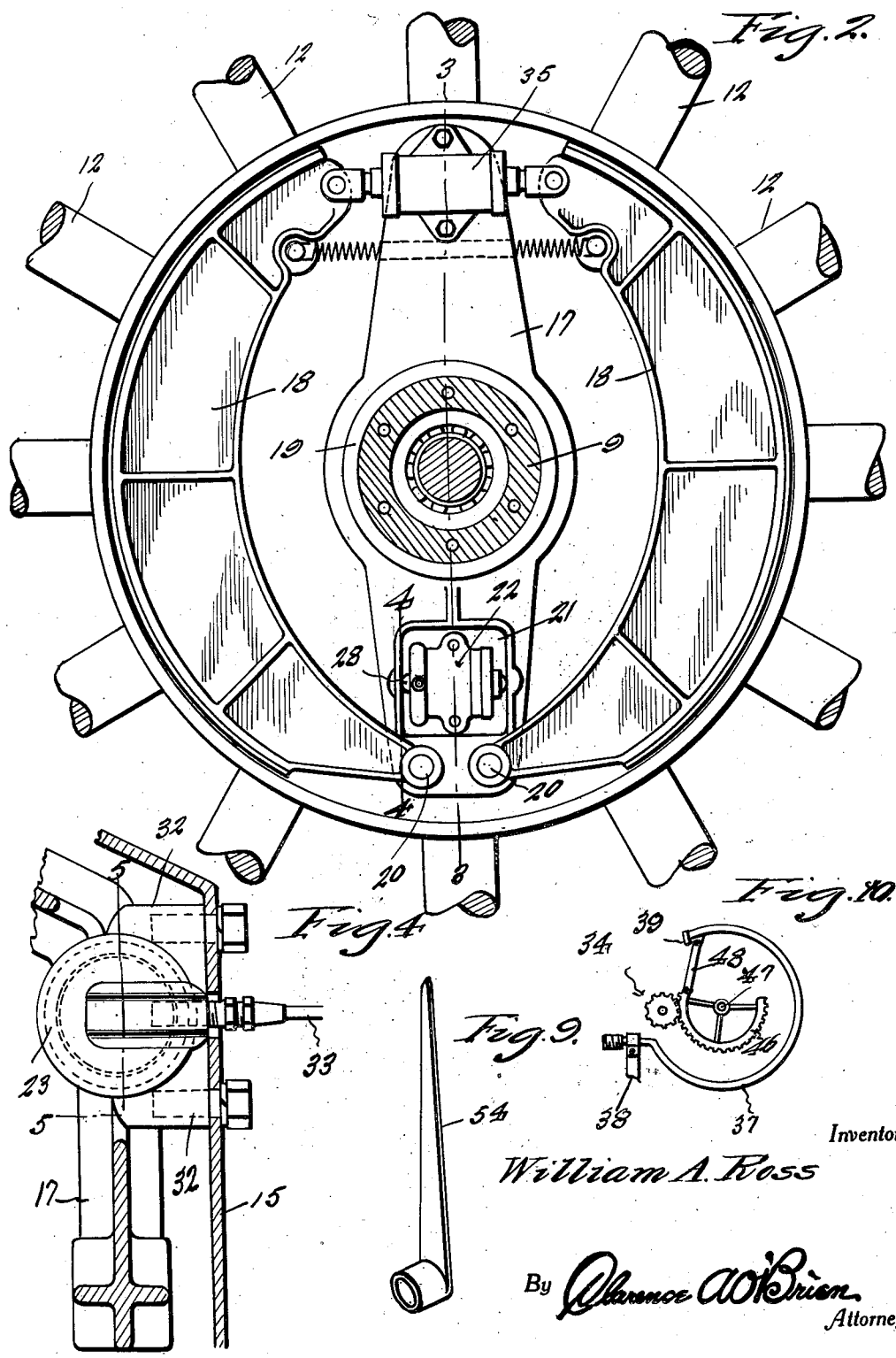

April 30, 1935.  W. A. ROSS  1,999,947
BRAKE TESTING MECHANISM
Filed Feb. 9, 1932   3 Sheets-Sheet 3
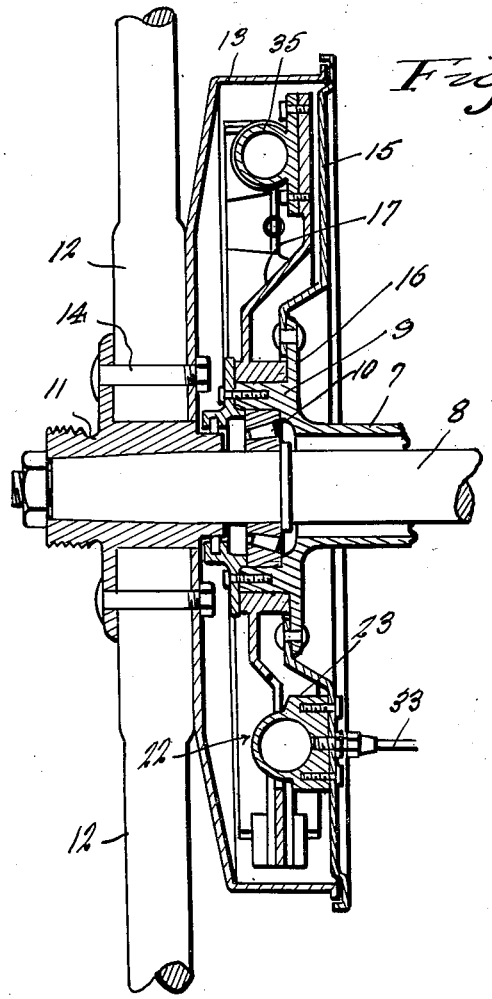
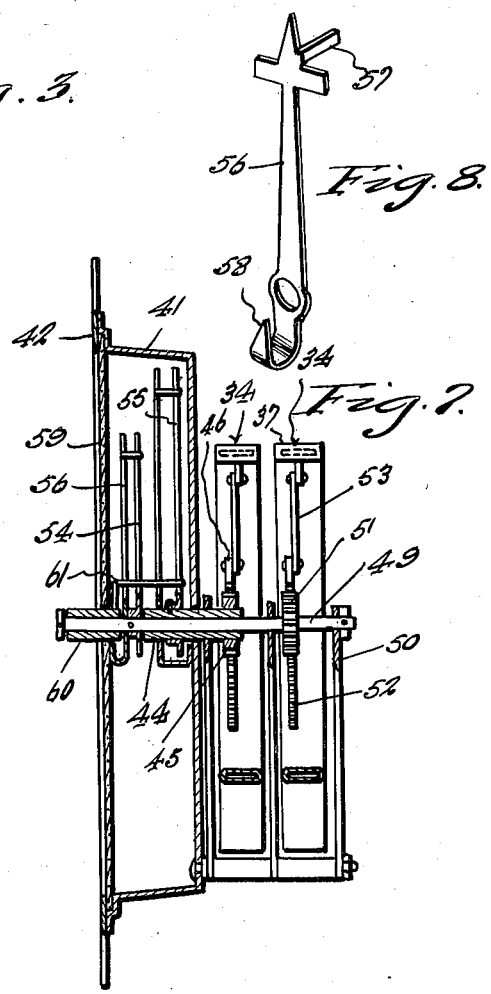
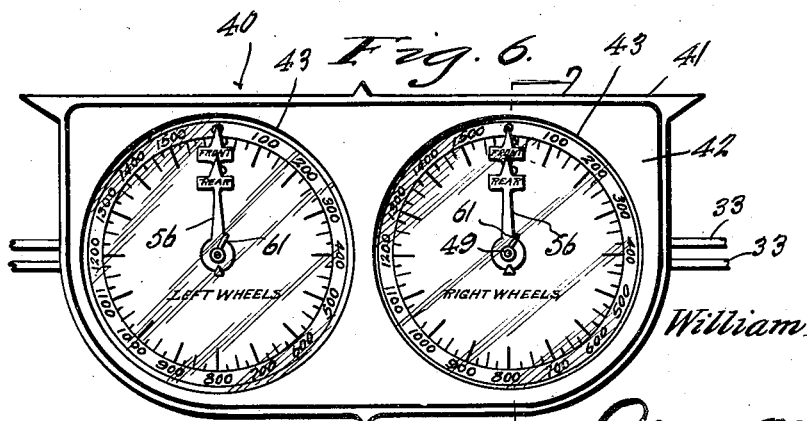
Inventor
William A. Ross
By Clarence A. O'Brien
Attorney Patented Apr. 30, 1935

1,999,947

UNITED STATES PATENT OFFICE 1,999,947

BRAKE TESTING MECHANISM

William A. Ross, Springfield, Ill.

Application February 9, 1932, Serial No. 591,859

1 Claim. (Cl. 265—47)

This invention appertains to new and useful improvements for means for testing brakes on automobiles, airplanes and other vehicles, having a braking system.

The principal object of this invention is to provide a brake testing mechanism operative to test the brakes of an airplane or vehicle while the airplane or vehicle is being driven or landed.

Another important object of the invention is to provide a brake testing mechanism which will indicate to the driver of a vehicle or airplane the condition of his brakes, while he is driving.

Other important objects and advantages of the invention will become apparent to the reader of the following specification.

In the drawings:—

Figure 1 represents a top plan view of an automobile chassis showing the wheel mount and the connections between the various brakes and the indicating means.

Fig. 2 represents a fragmentary vertical sectional view showing the interior of one of the brakes.

Fig. 3 represents a vertical sectional view taken substantially on line 3—3 of Fig. 2.

Fig. 4 represents a fragmentary detailed sectional view taken substantially on line 4—4 of Fig. 2.

Fig. 5 represents a fragmentary detailed sectional view taken substantially on line 5—5 of Fig. 4.

Fig. 6 represents a front elevational view of the indicating instrument.

Fig. 7 represents a sectional view taken substantially on line 7—7 of Fig. 6.

Fig. 8 represents a perspective view of one of the marker hands.

Fig. 9 represents a perspective view of one of the indicator arms.

Fig. 10 represents a side elevational view of one of the pressure responsive mechanisms of the indicator.

Fig. 11 represents a perspective view of the resetting device.

Referring to the drawings wherein like numerals designate like parts, it can be seen in Fig. 1 that numeral 5 represents the chassis frame of an automobile provided with the front axle bar 6 and the rear axle housing 7 through which the axle 8 extends.

As the brake assemblies are all substantially identical in construction, a description of one of the rear brake assemblies will suffice for the other.

Referring to Fig. 3, it can be seen that the rear brake assembly represented consists of a collar 9 on the adjacent end of the axle housing 7 between which and the axle 8 is the roller bearing mount 10. Numeral 11 represents the hub of the adjacent wheel from which extends the spokes 12.

Numeral 13 represents the cylindrical brake drum which is secured by the spoke bolt 14 to the wheel. Numeral 15 represents a disk-shaped dust plate secured to the flange 16 on the collar 9 and is at the inside end of the drum 13.

In conventional types of brake mechanisms, the tie plate 17, which is the anchor plate for the brake shoes 18—18 is fixed to the collar 9, but in the present case, the same is provided with an enlarged ring 19 which affords a bearing, this ring being rotatable on the collar 9, so that the tie plate 17 is free to swing on the collar 9. To the lower end of the plate 17, the lower ends of the shoes 18—18 are pivotally connected as at 20, and immediately above this portion on the plate 17 is the opening 21 within which is the dash pot 22.

As shown, in Fig. 5, this dash pot includes the barrel 23 having the boss 24. The boss 24 by engaging the tie plate 17 at the one side forces the other side of the tie plate against the plunger 28, so as to place the spring under slight compression when the brakes are released. The other end of the barrel 23 is open and slidable thru this end of the barrel 23 is the plunger 25. A packing cup 26 is provided at the inner end of the plunger 25 and interposed between this cup and the closed end of the barrel 23 is a coiled compressible spring 27.

A nipple-like extension 28 is provided on the outer end of the plunger 25 and a dust-proof web 29 of tubular construction has one end secured to the open end portion of the barrel 23 as at 30 and at its opposite end to the nipple structure 28 as at 31.

The barrel 23 is provided with apertured ears 32—32 which are secured to the aforementioned dust-proof plate 15 which is stationarily secured to the housing 16.

A tube 33 extends from the barrel 23 to one of the pressure responsive mechanisms 34 (see Fig. 10). Between the upper ends of the shoes 18—18 is the actuator 35 which may be of the pneumatic or mechanical type.

It can now be seen, that when the actuator 35 is operated and the shoes 18—18 are brought into engagement with the drum 13, the tendency of the drum and wheel is to switch the brake mechanism, and in the present invention this is permitted with a slight limit sufficient to result in a slight twist of the plate 17.

This results in an application of force against the nipple structure 28 which in moving inwardly will displace some of the liquid contents of the barrel 23, this being forced under pressure through the corresponding tube 33. The fluid under pressure enters the semi-circular shaped flat tube 37 which is supported by the bracket 38, the outer end of the tube 37 being free and closed as at 39.

Numeral 40 generally refers to the indicator instrument which has been placed on the dash board of an automobile in view of the driver, and this consists of the open front casing 41. This casing is provided on its front with the panel 42 having the opening 43—43 therein and behind which dials are placed. Each of these dials and its associated mechanism, represents one instrument, the instrument on the left for testing the left wheels while the instrument on the right is for testing the right wheel brakes. As both instruments are of the same construction, a description of one will suffice for both.

The instrument on the right includes a rotatable barrel 44 journalled through the rear wall of the casing 41 and having on its rear end a gear 45. This gear 45 meshes with the quadrant rack 46 swingably mounted as at 47 and this rack 46 is connected to the free end of the pressure tube 37 by the pivot link 48.

Extending through this barrel 44 and extending both forwardly and rearwardly thereof is the shaft 49 which is journalled through the rear bearing 50. The rear end portion of this shaft 49 is equipped with a gear 51 which can mesh with the quadrant rack 52, the latter being swingably supported and connected by the link 53 to the pressure tube 37 of the corresponding pressure responsive mechanism 34.

The tube 33 extending from the right rear brake leads to the mechanism 37 which operates the shaft 49 and the tube 33 which leads from the right front brake communicates with the mechanism 34 which operates the barrel 24.

Secured to the shaft 49 and barrel 44 within the confines of the casing 41 are the indicator arms 54 and 55. For each of these arms 54 and 55 there is a marker hand 56, the same being provided at its outer end with a lug 57 against which the corresponding indicator arm can engage when in motion to move the hand 56 to a set position.

The inner end portion of each hand 56 is provided with a spring extension 58 disposed backwardly, the hand 56 for the arm 54, bearing 58, tensionally engaging the pane 59 while the spring 58 on the hand 56 associated with the arm 55 tensionally engages the rear wall of the casing 41.

Thus it can be seen, that when the arms 54 and 55 operate, the marker hands 56 are carried therewith and left at the extreme position of movement of the arm where they remain due to the frictional engagement of the springs 58 with the pane 59 or rear wall of the casing 41.

Fig. 11 discloses a resetting element which consists of the sleeve 60 on the forward end of the shaft 49. This sleeve extends through an opening in the pane 59 around the shaft 49 and carries an upwardly and outwardly extending member 61 which is engageable with both of the hands 56. Obviously by rotating the sleeve 60, the member 61 will return the hand to zero position.

While the foregoing specification sets forth the invention in specific terms, it is to be understood that numerous changes in the shape, size and materials may be resorted to without departing from the spirit and scope of the invention as claimed hereinafter.

Having thus described my invention, what I claim as new is:—

In combination, a rotary shaft, a drum adapted to rotate with the shaft, a tie plate having an opening therein through which the shaft extends and rotates, said tie plate being mounted for limited rotary movement, a pair of brake shoes in the said drum, each of said shoes having one of its ends pivotally connected to the same end of the tie plate, an operator interposed between the remaining ends of the shoes said plate, adjacent its end to which the shoes are pivotally connected, being provided with an opening, a stationarily mounted dash pot having a fluid content and a fluid outlet, said dash pot including a shell closed at one end and a piston operative within the other end thereof, said shell, at one end, being provided with a boss for engaging the tie plate at one end of the last mentioned opening therein, and a boss on the outer end of the piston for engaging the tie plate at the opposite end of the last mentioned opening.

WILLIAM A. ROSS.